UNITED STATES PATENT OFFICE.

RUDOLF EMMERICH, OF MUNICH, GERMANY.

PROCESS OF PRESERVING MEAT.

No. 909,172.   Specification of Letters Patent.   Patented Jan. 12, 1909.

Application filed March 10, 1903. Serial No. 147,184.

*To all whom it may concern:*

Be it known that I, RUDOLF EMMERICH, a citizen of Bavaria, Germany, residing at Munich, Bavaria, Germany, have invented certain new and useful Improvements in Processes of Preserving Meat; and I do hereby declare the following to be a full, clear, and exact description of the invention, such as will enable others skilled in the art to which it appertains to make and use the same.

The present invention consists of a process for preserving meat in a raw condition.

Hitherto meat has been preserved by forcing a preserving fluid into the blood vessels, but this necessitates the employment of high pressure, in order to force the impregnating fluid into the finest vessels. The meat preserved in this manner differs, moreover, from fresh meat. Thus for instance salt or pickled meat is obtained if salt water is employed; acidulated meat is produced if acetic acid is used for the purpose. In other words the meat is always cured to a certain extent by the means employed for preserving it. Meat has also been preserved by suitable mixtures of methyl alcohol, salicylic acid, glycerin, alum, potash and many other means, some of which are absolutely unhealthful. In all cases the fluids remain in the meat until it is required for food, which has the disadvantage that the content of water in the meat is increased, and that it is chemically altered to a certain extent.

The object of this invention is to preserve the meat in an unaltered condition, so that when required for food it will be in exactly the same state as fresh meat. The meat is not impregnated, in the present case, so that no high pressure is necessary. The water in the meat is not increased, nor does any chemical alteration of the meat take place. No unhealthful substances are introduced into the meat, nor are any such generated therein.

The present process is based on the results of experiments of the inventor, which have shown that in cases of putrefaction, the infection starts primarily from the larger blood vessels, so that a short time after slaughter and disemboweling, germs of putrefaction will be found in the larger veins to a considerable extent, while few or none are present in the smaller vessels and the muscle cells at this time are entirely free of all germs. Hitherto it has been assumed that the bacteria started at the surface of the meat, or where it had been cut and penetrated directly into the depths of the cell formation, and that they spread particularly in the loose parts of the cells between the muscles and the bone.

The main object of the present process is to produce certain conditions in the larger blood vessels which shall prevent the development of fungi, without however altering the main body of the meat. The effect of the process must not extend beyond the greater vessels, so that the smaller veins and capillary vessels, as also the muscle tissues, remain in all respects as they were.

The process is carried out in the following manner:—The animals are slaughtered and disemboweled in the ordinary manner, care being taken that the larger vessels in the belly and the chest cavity are not destroyed. Without cutting the carcass up, the main arteries and veins are thoroughly washed out with a suitable antiseptic fluid. Such fluid may consist for instance of a more or less diluted solution of acetic acid. The apparatus by means of which this manipulation is performed may consist of a bottle, having a lower outlet opening, which may be raised and lowered in any suitable manner, and with which a glass tube is in communication by means of a rubber tube or the like. These glass tubes are provided with various mouthpieces corresponding in size to the various vessels and, if the mouthpiece is made conical, they need not be attached to the blood vessels.

The larger arteries and veins in the chest and belly hollows are isolated and laid open. The washing is not done in one operation, but progressively in certain limited parts of the blood vessel system, the arteries and veins being treated separately. Thus for instance, the arteries and veins of the hind quarters, of the middle parts and of the fore quarters are each treated separately, making in all six operations for each animal or carcass. This method of carrying out the washing operation is advisable, because low pressures may be employed, in order to prevent the fluid from going too far through the veins or arteries.

The cleansing is carried out by inserting the glass tubes above mentioned in the blood vessels and pressing them tightly in, whereupon the bottle is raised as high as may be necessary to force the fluid into the first parts of the larger arteries or veins, which may be easily observed since the rise of the fluid in the veins or arteries in question can be clearly discerned. As soon as the initial portion of the vessels have been sufficiently filled, the bottle is lowered again so that the main body of the liquid may run out of the vessels again. The liquid remaining in the vessels will be quite sufficient to prevent the growth of fungi on the interior walls of the said vessels. In the present case there is no injection of the whole blood vessel system under high pressure from a single point, but only the initial parts of the larger vessels are rinsed out, and the fluid must not be allowed to penetrate to the meat, otherwise the latter would no longer constitute fresh meat. By this treatment, the edible flesh remains in its natural condition while those parts of the carcass subjected directly to the action of the antiseptic fluid consist only of the unedible larger blood vessels. While the carcass is retained in its undivided condition, as for instance, being quartered only without being cut into smaller pieces, the edible flesh and the small capillary vessels traversing the same are isolated from exterior influences and consequent infection by those portions of the larger blood vessels which have been treated and which are thrown away as waste when the meat is finally subdivided for retail consumption.

Meat preserved in the above described manner will keep much longer than ordinary meat, if undivided or only quartered because infection is prevented in the larger blood vessels, and this infection is the root of rapid putrefaction. The meat is therefore only subjected to superficial infection, which makes but very slow progress. This infection may be dealt with in the known manner for instance either by wrapping the meat in acidulated cloths or by keeping the same in dry air not too warm or by packing it up in suitable known manner.

I claim as my invention:—

1. The process of preserving meat which consists in treating with a suitable antiseptic the larger blood vessels which form no part of the edible flesh, leaving the smaller blood vessels untreated and retaining the carcass in a substantially undivided condition with the treated portions of the blood vessels attached.

2. The process of preserving meat which consists in rinsing with a suitable antiseptic the interior of the larger blood vessels only which form no part of the edible flesh, permitting the surplus solution to drain away, and retaining the carcass in a substantially undivided condition with the treated portions of the blood vessels attached.

3. The process of preserving meat which consists in rinsing with a suitable antiseptic solution the exposed portion of the larger arteries and veins forming no part of the edible flesh, leaving the smaller and more remote blood vessels in their natural condition, and retaining the carcass in a substantially undivided condition with the treated portions of the blood vessels attached.

4. The process of preserving meat which consists in rinsing with a solution containing acetic acid the initial exposed portions only of the severed blood vessels which form no part of the edible flesh, thereafter withdrawing the solution therefrom so far as practicable, and retaining the carcass in a substantially undivided condition with the treated portions of the blood vessels attached.

5. The process of preserving meat which consists in injecting a solution containing acetic acid into the interior of the larger arteries and veins forming no part of the edible flesh, leaving the smaller and more remote blood vessels in their natural condition, and retaining the meat in a substantially undivided condition with the treated portions of the blood vessels attached.

In testimony whereof I affix my signature, in presence of two witnesses.

RUDOLF EMMERICH.

Witnesses:
  THEKLA NENNER,
  WALTER E. BAUSMAN.